United States Patent Office 3,410,709
Patented Nov. 12, 1968

3,410,709
METHOD OF PRODUCING A POLYETHYLENE COATING ON A METAL
Franz-Josef Meyer, Gladbeck, Westphalia, Leo Rensmann, Kiebeck, and Werner Dorrscheidt, Westerholt, Germany, assignors to Scholven-Chemie Aktiengesellschaft, Gelsenkirchen-Buer, Germany, a corporation of Germany
No Drawing. Filed Sept. 22, 1965, Ser. No. 490,168
Claims priority, application Germany, Sept. 29, 1964, 35,861
13 Claims. (Cl. 117—21)

It is known that shaped metallic parts can be protected against attack by corrosive agents by providing the metallic surface with a protective coating of fusible plastics which are resistant to the corrosive agents entering into consideration.

The application of such protective coatings is effected as is known by flame spraying, sintering or eddy sintering of the thermoplastic material on the metal surface which has normally been previously sandblasted.

Protective coatings of this type assure good protection against corrosion, but have the disadvantage that the temperatures with which the metallic shaped part can be used are only very low since protective coatings of thermoplastic material naturally melt above the melting point of the thermoplast.

Furthermore, protective coatings of this type are not resistant to various organic solvents, which can also lead to an impairment in the value in use of the protected metallic shaped parts.

In accordance with the present invention, infusible coatings which are extensively resistant to organic solvents are obtained by applying protective coatings of polyethylene by the eddy sintering method, a small amount of an organic peroxide being added to the powdered polyethylene.

As polymer, both polyethylene of high and of low density can be used.

As cross-linking agents, there enter into consideration the organic radical-formers customary for the cross-linking of polyolefins, for instance, benzoylperoxide, cumene-hydroperoxide, p-menthanehydroperoxide, pinanehydroperoxide, etc. There are preferably employed organic peroxides of high starting temperature such as, in particular, dicumylperoxide or α,α'-bis-t-butylperoxy-di-isopropylbenzene. The latter has the advantage of leading to odorless coatings.

The peroxide can be incorporated in customary fashion, for instance:

(1) If the polyethylene is in powder form, the peroxide is advisedly sprayed in solution onto the powder. Upon the driving off the solvent, there is obtained a powder with excellent distribution of the peroxide.

(2) In the case of granular polyethylene, one can proceed in two different manners, namely:

(a) grind the granulate and spray the peroxide on as in the case of (1);

(b) mix the peroxide into the granulate, for instance, in an internal mixer or on calenders, followed by grinding.

The method described under 2(b) is used particularly when employing high pressure polyethylene with which the incorporating of the peroxide at relatively low temperatures (about 120° C.) is still possible, whereby an insipient cross linking is avoided.

In accordance with the method of the invention, the shaped part which is to be protected is heated to above the melting point of the polyethylene and coated in known manner by dipping it into the fluidized bed consisting of powdered polyethylene and peroxide. The temperature of the shaped part should be maintained sufficiently low that substantially cross-linking of the polyethylene does not take place as yet. Temperatures of 150 to 250° C. are advisable, depending on the time of immersion and the desired thickness of the coating. With respect to the time of immersion the rule applies that it should be substantially shorter than the half life of the peroxide used at the immersion temperature, i.e. the temperature of the article when the article is placed in the bed. In general, several seconds, e.g. below 20, are sufficient.

The dipping process is followed by the cross-linking process produced by heat treatment, for instance in a hot air furnace the temperature of which is so adjusted that the cross-linking is complete within several minutes, e.g. within 15 minutes. The temperature depends on the decomposition characteristic of the peroxide. In the case of dicumylperoxide, which is preferably employed, and of α,α'-bis-t-butylperoxy-di-isopropylbenzene, the temperature range is between about 140 to 250° C. and preferably between about 180 and 220° C.

Protective coatings which have been prepared by the method of the invention are characterized by excellent adherence to the metal part, by substantially complete indissolubility, infusibility, resistance to the formation of stress cracks and good mechanical properties even at higher temperatures.

The organic peroxide is used in quantities of 0.01 to 10% by weight, referred to polyethylene, and preferably 1 to 5% by weight.

Thus, the invention provides a method of applying a plastic protective coating to a metal article. The method involves contacting finely divided, polyethylene admixed with an organic peroxide cross-linking agent therefor, with the surface of the article, and heating the polyethylene during such contacting to sinter the polyethylene and form a coating over the article. This heating to effect the sintering is conducted at a temperature and for a time such that substantially no cross-linking occurs. Following the sintering, the coated article is subjected to a further heat treatment, wherein cross-linking is effected and polyethylene is transformed into an infusible coating.

EXAMPLE 1

High pressure polyethylene of a density of 0.918 having a ⅕ (190° C.) melt index of 25 g./10 min. was homogenized on a calender with 3% by weight dicumylperoxide for 5 minutes at 120° C. The powder obtained by the grinding of the calender sheet was freed of fine and coarse particles so that the resultant particle size was between 60 and 250μ. In a fluidized bed produced by nitrogen sandblasted iron strips of 100×20×2 mm. are coated. The temperature of the iron strips was 200° C.; the time of immersion was 15 seconds.

After the immersion the strips were treated in a heating furnace for 10 minutes at 180° C.

The resultant coatings adhered very firmly, were insoluble in p-xylene and Decaline, and withstood even continuous stresses at 250° C.

EXAMPLE 2

Low pressure polyethylene of a density of 0.960 and a melt index of 30 g./10 min. was sprayed in powder form with a 5% solution of dicumylperoxide in n-hexane. After the solvent had been driven off in vacuum up to 50° C., the powder contained 3% by weight dicumylperoxide. The immersion and after-treatment were effected in the same manner as described above. Strip temperature at time of immersion, 230° C.; immersion time 15 seconds.

The coatings were characterized by the same advantageous properties as indicated in Example 1.

What is claimed is:
1. Method of applying a plastic protective coating to a metal article which comprises contacting finely divided, polyethylene admixed with an organic peroxide cross-linking agent therefor, with the surface of the article, and heating the polyethylene during said contacting to sinter the polyethylene and form a coating thereof over the article, said heating being at a temperature and for a time such that substantially no cross-linking occurs, and thereafter heating the coating to effect cross-linking and transform the polyethylene into an infusible coating.

2. Method of claim 1, wherein said organic cross-linking agent is $\alpha,\alpha'$-bis-t-butylperoxy-di-isopropylbenzene, dicumylperoxide, or a mixture thereof.

3. Method of claim 1, wherein said organic cross-linking agent is $\alpha,\alpha'$-bis-t-butylperoxy-di-isopropylbenzene.

4. Method of claim 1, wherein said organic cross-linking agent is dicumylperoxide.

5. Method of claim 1, wherein the article is immersed in a fluidized bed of the polyethylene, and the article is heated to an elevated temperature and the heating to effect said sintering is by heat transfer from the metal to the polyethylene contacted therewith, the time of immersion being less than the half life of the peroxide at said elevated temperature, said heating of the coating to effect the cross-linking being after the immersion in the fluidized bed.

6. Method of claim 5, wherein said organic cross-linking agent is $\alpha,\alpha'$-bis-t-butylperoxy-di-isopropylbenzene, dicumylperoxide, or a mixture thereof.

7. Method of claim 5, wherein said organic cross-linking agent is $\alpha,\alpha'$-bis-t-butylperoxy-di-isopropylbenzene.

8. Method of claim 5, wherein said organic cross-linking agent is dicumylperoxide.

9. Method of claim 5, wherein the heating to effect cross-linking is for up to 15 minutes.

10. Method of claim 9, wherein said contacting is below 20 seconds.

11. Method of claim 1, wherein the heating to effect cross-linking is for up to 15 minutes.

12. Method of claim 11, wherein said contacting is below 20 seconds.

13. Method of claim 1, wherein the peroxide is about 0.01–10% by weight of the polyethylene.

References Cited

UNITED STATES PATENTS

| | | | |
|---|---|---|---|
| 2,844,489 | 7/1958 | Gemmer | 117—18 X |
| 3,027,346 | 3/1962 | Rugg et al. | 117—132 X |
| 3,032,816 | 5/1962 | Zimmerli | 117—21 X |
| 3,043,716 | 7/1962 | Bosse et al. | 117—132 |
| 3,044,899 | 7/1962 | Canterino | 117—132 |
| 3,111,419 | 11/1963 | Nahin | 117—21 |
| 3,154,530 | 10/1964 | Mullen | 117—21 X |

WILLIAM D. MARTIN, *Primary Examiner.*

P. F. ATTAGUILE, *Assistant Examiner.*